(12) United States Patent
Wu et al.

(10) Patent No.: US 9,482,775 B2
(45) Date of Patent: Nov. 1, 2016

(54) REAL-TIME FORMATION ANISOTROPY AND DIP EVALUATION USING TRI-AXIAL INDUCTION MEASUREMENTS

(75) Inventors: Peter T. Wu, Missouri City, TX (US); Thomas D. Barber, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1107 days.

(21) Appl. No.: 13/574,665

(22) PCT Filed: Jan. 21, 2011

(86) PCT No.: PCT/US2011/021986
§ 371 (c)(1),
(2), (4) Date: Dec. 13, 2012

(87) PCT Pub. No.: WO2011/091216
PCT Pub. Date: Jul. 28, 2011

(65) Prior Publication Data
US 2013/0080058 A1    Mar. 28, 2013

Related U.S. Application Data

(60) Provisional application No. 61/297,353, filed on Jan. 22, 2010.

(51) Int. Cl.
*G01V 3/12* (2006.01)
*G01V 1/42* (2006.01)
*G01V 3/30* (2006.01)
*G06F 19/00* (2011.01)

(52) U.S. Cl.
CPC . *G01V 3/12* (2013.01); *G01V 1/42* (2013.01); *G01V 3/30* (2013.01); *G06F 19/00* (2013.01)

(58) Field of Classification Search
None
See application file for complete search history.

(56) References Cited

U.S. PATENT DOCUMENTS

| 6,934,635 B2 | 8/2005 | Kennedy |
| 7,076,370 B1 | 7/2006 | Freedman et al. |
| 2006/0031017 A1* | 2/2006 | Mathieu ............... G01V 3/20 702/6 |
| 2008/0211507 A1 | 9/2008 | Zhdanov |
| 2009/0030616 A1* | 1/2009 | Sugiura ............... G01V 11/00 702/9 |

FOREIGN PATENT DOCUMENTS

EP    2113794 A1    11/2009

OTHER PUBLICATIONS

International Search Report and Written Opinion of PCT Application No. PCT/US2011/021986 dated Aug. 31, 2012.

* cited by examiner

*Primary Examiner* — Aditya Bhat
(74) *Attorney, Agent, or Firm* — John Vereb (57) ABSTRACT

The present disclosure relates to a method to determine a formation property of a subsurface formation. A downhole logging tool having two or more tri-axial antennas is provided and used to obtain azimuthally sensitive data. Borehole correction is performed on the obtained data and a ZD-inversion is performed on the borehole corrected data for all antenna spacing groups. A formation indicator flag is determined and, depending on the determined formation indicator flag, a 1D-axial inversion and/or a 1D-radial inversion is performed over selected zones, or neither is performed. The best ZD-inversion results are selected and the 1D-axial inversion results and/or the 1D-radial inversion results, if any, are combined with the selected best ZD-inversion results to form a composite inversion result. The formation property of the subsurface formation is determined using the composite inversion result.

15 Claims, 7 Drawing Sheets

REAL-TIME FORMATION ANISOTROPY AND DIP EVALUATION USING TRI-AXIAL INDUCTION MEASUREMENTS

CROSS-REFERENCE TO OTHER APPLICATIONS

This application claims, under 35 U.S.C. §119(e), priority to and the benefit of U.S. Provisional Application No. 61/297,353, filed Jan. 22, 2010.

BACKGROUND

1. Technical Field

The present disclosure relates generally to the logging of subsurface formations surrounding a wellbore using a downhole logging tool, and particularly to determining when higher order processing of the logging measurements is advantageous or appropriate.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used. Early logging tools were run into a wellbore on a wireline cable, after the wellbore had been drilled. Modern versions of such wireline tools are still used extensively.

Figure 1:
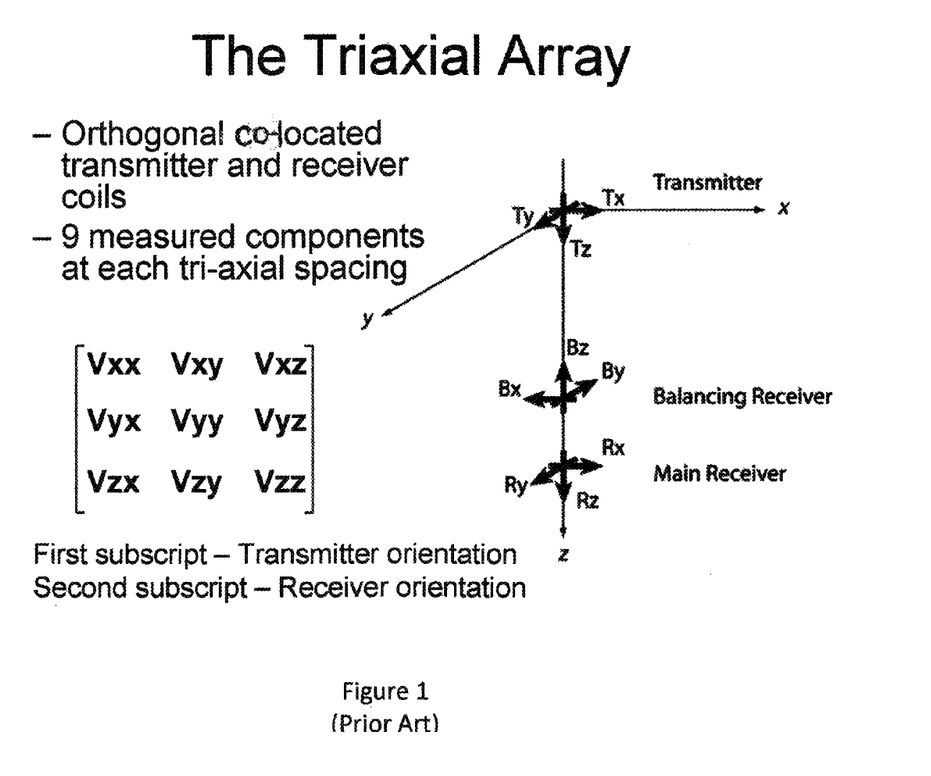
FIG. 1 is a schematic drawing of an exemplary prior art tri-axial array and its associated measurement.
Figures 2A, 2B:
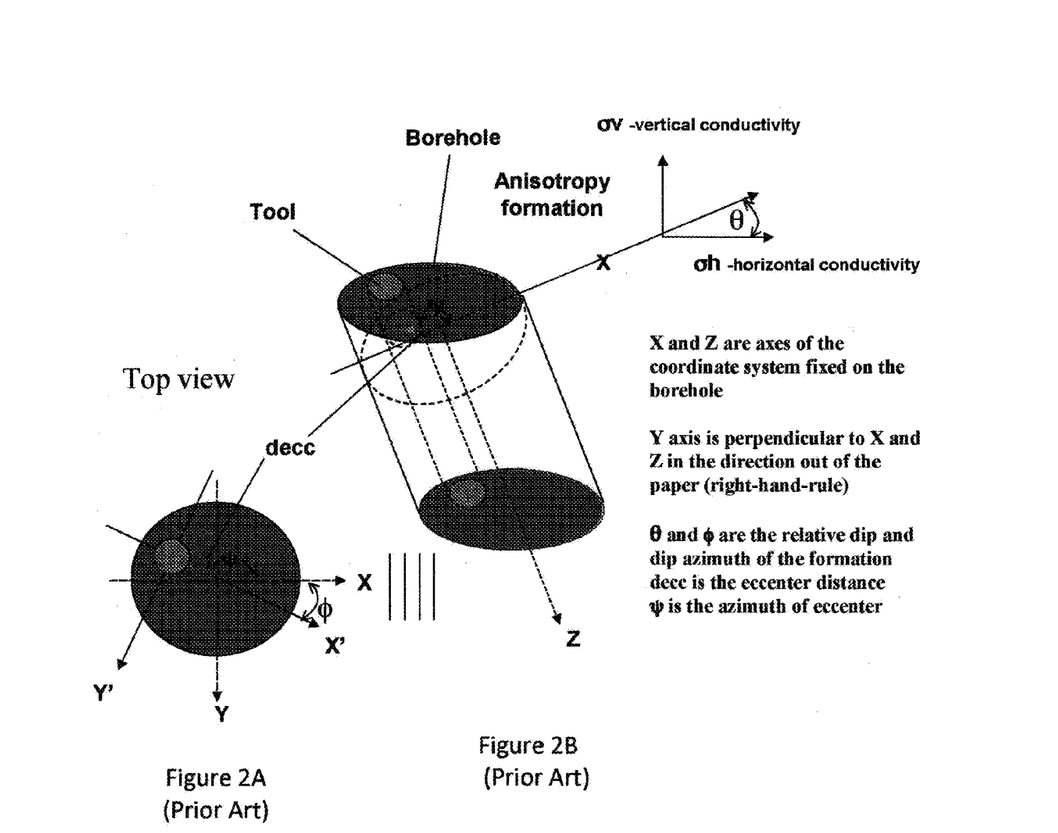
FIGS. 2A and 2B are schematic drawings of a top view and a perspective view, respectively, of an eccentered tool in a borehole drilled through an anisotropic formation having a dip angle (prior art).

A 3D tri-axial induction tool can measure the nine-component apparent conductivity tensor ($\sigma m(i, j, k)$, j, k=1, 2, 3) at multiple spacings represented by the index i. FIG. 1 illustrates an exemplary prior art tri-axial array and associated measurement. Those measurements are usually obtained in the frequency domain by firing the transmitter with a continuous wave (CW) of a given frequency to enhance the signal-to-noise ratio. However, measurements of the same information content could also be obtained and used from time domain signals through a Fourier decomposition process. This stems from the well-known physics principle of frequency-time duality. Certain formation properties, such as horizontal and vertical conductivities ($\sigma h$, $\sigma v$), relative dip angle ($\theta$), and the dip azimuthal direction ($\Phi$), as well as borehole/tool properties, such as mud conductivity ($\sigma mud$), hole diameter (hd), tool eccentering distance (decc), and tool eccentering azimuthal angle ($\psi$) affect the conductivity tensors. FIGS. 2A and 2B illustrate an eccentered tool in a borehole drilled through an anisotropic formation having a dip angle. In even a simplified model of a layered anisotropic formation traversed obliquely by a borehole, the response represented by the conductivity tensors depends on the above eight parameters ($\sigma h$, $\sigma v$, $\theta$, $\Phi$, $\sigma mud$, hd, decc, $\psi$) in a very complicated manner. The effects of the borehole/tool on the measured conductivity tensors may be very big, even in an oil base mud (OBM) environment. However, through one or more inversion techniques, the above borehole/formation parameters can be calculated and the borehole effects removed from the measured conductivity tensor.

Figure 3A:
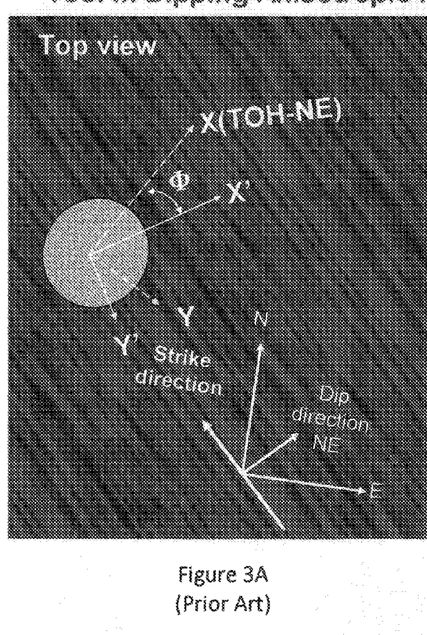
FIG. 3A schematically shows a top view of a simple prior art model of a uniform anisotropic formation having an arbitrary dip angle with respect to the tool.
Figure 3B:
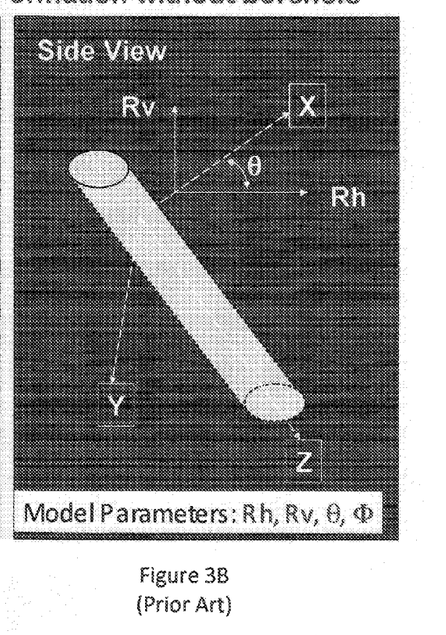
FIG. 3B shows a side view of the model of FIG. 3A.

After borehole correction, the borehole corrected measurements can be further processed using a simplified model that does not contain a borehole. For example, one may employ a simple model of uniform anisotropic formation having an arbitrary dip angle with respect to the tool, as illustrated in FIGS. 3A and 3B. This is often referred to as a "zero-dimensional" (ZD) model because the modeled formation does not vary in the axial and radial directions of the tool. In the ZD model, the controlling parameters are formation horizontal (Rh) and vertical (Rv) resistivities, the relative dip angle ($\theta$), and the dip azimuth angle ($\Phi$). (Note, the resistivity is the reciprocal of the conductivity, so those terms are used somewhat interchangeably throughout this disclosure since knowing one makes it a simple matter to compute the other.) In a real-world logging environment, the formation properties are generally unknown. The simple ZD model is generally the most versatile processing model available to generate coarse estimates of formation properties over the well path.

SUMMARY

The present disclosure relates to a method to determine a formation property of a subsurface formation. A downhole logging tool having two or more tri-axial antennas is provided and used to obtain azimuthally sensitive data. Borehole correction is performed on the obtained data and a ZD-inversion is performed on the borehole corrected data for all antenna spacing groups. A formation indicator flag is determined and, depending on the determined formation indicator flag, a 1D-axial inversion and/or a 1D-radial inversion is performed over selected zones, or neither is performed. The best ZD-inversion results are selected and the 1D-axial inversion results and/or the 1D-radial inversion results, if any, are combined with the selected best ZD-inversion results to form a composite inversion result. The formation property of the subsurface formation is determined using the composite inversion result.

Other aspects and advantages will become apparent from the following description and the attached claims.

DETAILED DESCRIPTION

Some embodiments will now be described with reference to the figures Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually independent. That is, the dipole moment of any one of the antennas does not lie in the plane formed by the dipole moments of the other two antennas. Three orthogonal antennas, with one antenna axial and the other two transverse, is one example of a triaxial antenna. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Disclosed herein is a method of using conductivity tensor measurements to derive coarse formation properties such as Rh, Rv, dip, and azimuth through a ZD model. The resulting coarse logs can be used to identify zones over which higher order processing, such as a 1D inversion, may be appropriate. For example, 1D inversion is appropriate to improve the vertical resolution of Rh and Rv logs over a zone in which Rh and Rv are varying, but the dip and azimuth are essentially constant. If appropriate, improved formation property logs may be produced using a composite of the ZD and higher order processing results.

Before tri-axial induction tools were invented, most of the induction tools had only axial (or ZZ) coils (that is, coils with magnetic moments directed along the axial, or Z coordinate direction of the tool) with which to make their measurements. Such ZZ coil tools could measure only the horizontal resistivity in a vertical well passing through horizontally layered formations. Obviously, for a hydrocarbon bearing zone, the condition of a vertical well passing through horizontally layered formations rarely exists. As previously stated, a formation layer usually is characterized by Rh, Rv, dip, and azimuth of the layer. The apparent conductivity tensor measured by a tri-axial induction tool is sensitive to those formation parameters. Various inversion techniques, such as an axial 1D inversion, have been developed to solve for the formation parameters from the tri-axial measurements. The axial 1D inversion model allows layered anisotropic formations to have different Rh and Rv values for each layer. However, the model requires the dip and azimuth of all the anisotropic layers within the processing window to be the same. If the assumed model conditions are met, the axial 1D inversion can produce higher resolution Rh and Rv logs in each layer than those from a ZD inversion. For example, the results are free from shoulder bed effects.

Under normal logging conditions, the dip and azimuth of the formation are unknown and generally highly variable, even for a vertical well. If one applies an axial 1D inversion indiscriminately, there is no effective way to discern whether the axial 1D model assumptions are met or not. Therefore, the validity of the resultant logs becomes questionable. However, a hierarchical method in which the simplest model, in this case, a ZD model, can be used to first generate coarse formation parameters. The ZD results may then be scanned for zones in which the formation dip and azimuth are nearly constant such that an axial 1D inversion model is a reasonable representation of the formation. The criteria for the acceptable variation of dip and azimuth within the axial 1D processing window are preferably established separately through modeling. The axial 1D inversion processing can then be done to obtain refined vertical resolution logs over the selected zones in which the criteria for acceptable variation of dip and azimuth are met. This hierarchical method helps improve the quality control of the overall processing and also saves processing time by not running the time consuming axial 1D inversion over the entire log, but instead limits it to a few selected zones for which the axial 1D model assumptions are met.

The ZD processing can be done using data from various tri-axial spacings. In a thick, homogeneous, non-permeable zone, the results from all spacings are generally the same (i.e., logs from all spacings generally lie on top of one another). Over zones with thin beds, the results from shorter spacing data generally show a sharper vertical response than those from longer spacings. The bedding structure is sometimes not readily discernable from the resistivity properties of the formation alone. Quite often, the resistivity logs (Rh and Rv) do not change much, while the dip and azimuth logs vary quite rapidly. So, in determining the presence of thin beds, not only should the variation of the Rh, Rv logs be considered, but also the variation of the dip and azimuth logs. Over permeable zones in which invasion has occurred, the shorter spacing results tend to have larger bias errors with respect to the virgin formation properties than do the longer spacing results. Therefore, by comparing the results from different spacings, one can select the best results; that is, those that are closest to the true formation properties.

Similar to identifying zones suitable for axial 1D inversion processing, the results from different spacings can be used to identify zones suitable for radial 1D inversion processing. Such processing allows one to obtain invaded layer and virgin layer formation properties. Usually, the radial 1D inversion model allows formation properties to be different in each concentric radial layer centered on the tool. The formation is assumed to be uniform in the axial direction with the same dip and azimuth. The zones that are appropriate for the radial 1D inversion model can be identified from ZD modeling results.

A set of output logs for formation properties (Rh, Rv, dip, and azimuth, and for the case of invasion zones for which a radial 1D is run, the additional outputs of Rhxo and Rvxo for the invaded zone horizontal and vertical resistivities, respectively) can be generated as a composite of the results from the best ZD, axial 1D, and radial 1D inversions.

Figure 4:
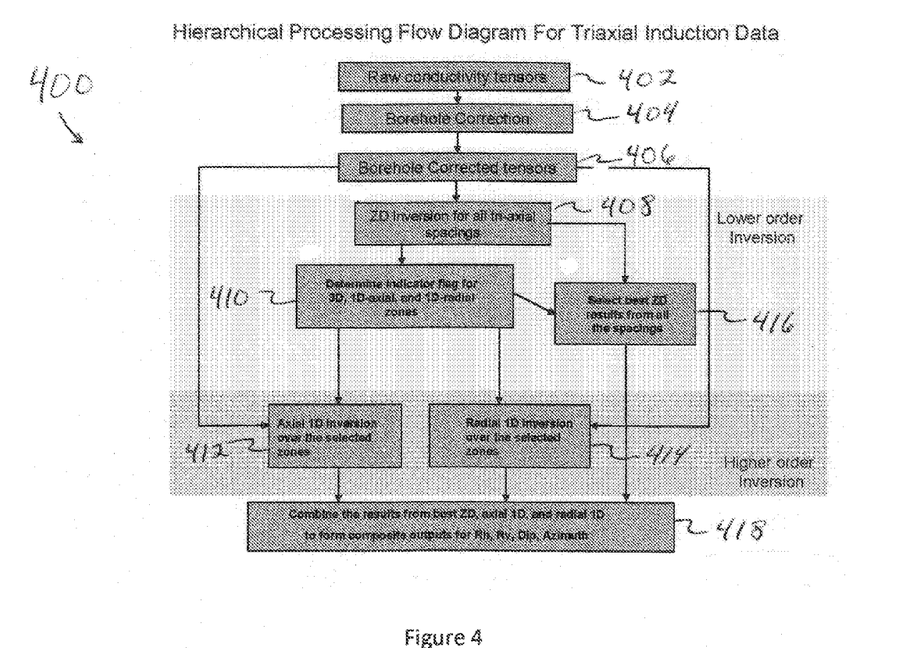
FIG. 4 is a flowchart showing an exemplary hierarchical processing flow for triaxial induction data, in accordance with the present disclosure.

FIG. 4 shows a flow diagram 400 for the above hierarchical processing. Lower order processing is performed first to determine the appropriate zones, if any, for further higher order processing. At the end, the results from the best ZD, axial 1D, and radial 1D inversions are combined to form composite outputs. More specifically, conductivity (or resistivity) data is obtained (step 402). Borehole correction factors are determined (step 404) and applied to produce borehole corrected tensors (step 406). ZD inversion is performed for all tri-axial spacings (step 408). An indicator flag (explained in more detail below) is determined (step 410) and, if appropriate, 1D-axial (step 412) and/or 1D-radial (step 414) inversion processing is performed over selected zones. The best results of the ZD inversion are selected (step 416), and combined with the axial and/or radial inversion results, if any (step 418).

Figure 5:
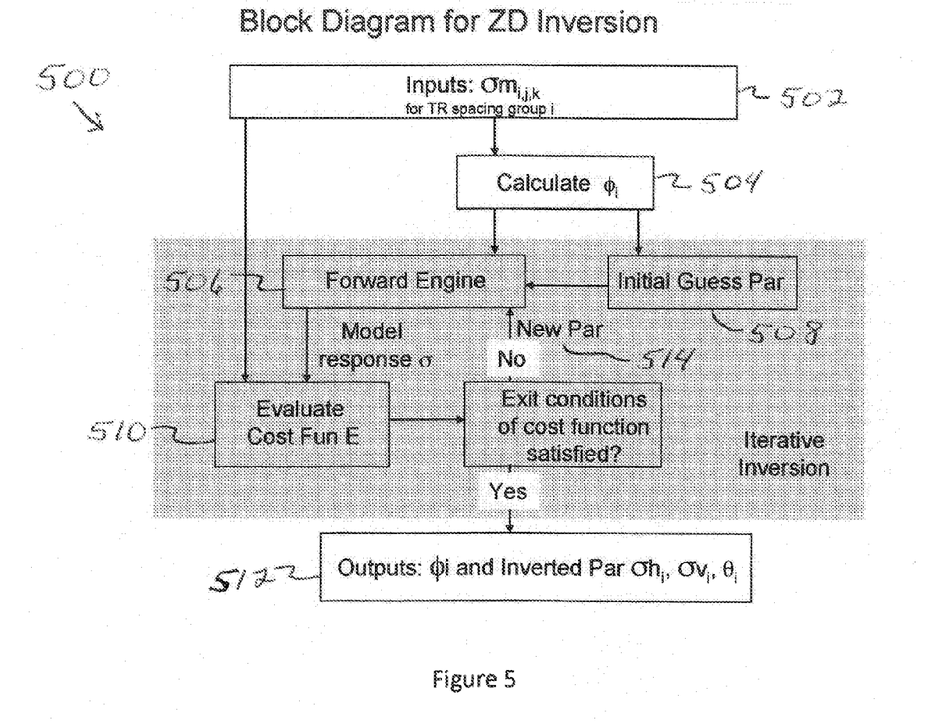
FIG. 5 is a flowchart showing a block diagram for an exemplary ZD inversion, in accordance with the present disclosure.

FIG. 5 shows a block diagram 500 for one embodiment of a ZD inversion. To invert for the formation parameters (σh, σv, θ, Φ), an iterative minimization process may be used. Based on known techniques, one can compute the formation azimuthal angle Φ from the measured conductivity tensor σm(i, j, k). Here, the indices i, j, and k account for the transmitter-receiver (TR) spacing, the transmitter orientation, and the receiver orientation, respectively. Knowing the formation azimuthal angle allows one to eliminate one parameter from the inversion and hence greatly improve the robustness of the inversion. The inversion then only needs to invert for the three parameters (σh, σv, θ) that minimize a cost function, E. Thus, for a given TR spacing i, the data for the conductivity tensor is obtained (step 502). Using that data, the azimuthal angle is determined (step 504) and passed to a forward engine of the modeling software. The forward engine accepts a set of modeled formation parameters and generates a set of model responses (step 506). In a first pass, initial guesses for formation parameters are determined using the determined azimuthal angle and passed to the forward engine (step 508). The model response from the forward engine is used along with the measured conductivity data to evaluate a cost function (step 510). If an exit condition of the cost function is satisfied, the formation properties are output (step 512). Otherwise, new parameters are provided (step 514) to the forward engine and another iteration is performed. Further details on some of these steps are provided below.

The inversion is performed for every TR spacing group. For each group, i, a set of formation parameters $\sigma h_i$, $\sigma v_i$, $\theta_i$ and $\Phi_i$ are obtained. There are various ways to form TR spacing groups. For example, one TR spacing group could comprise data from a single triaxial spacing. Alternatively, to enhance the signal-to-noise ratio, one may use data from multiple triaxial spacings to form a TR spacing group. For example, one may group the data for the following TR spacings:

| | |
|---|---|
| 15"+21" | Group 1 |
| 15"+21"+27" | Group 2 |
| 21"+27"+39" | Group 3 |
| 27"+39"+54" | Group 4 |
| 39"+54"+72" | Group 5 |
| 54"+72" | Group 6 |

The effective TR spacing of each group is the averaged spacing of the constituent data in the group.

A cost function is constructed to relate the cost of inversion to the degree of match between the measured data and modeled data. The forward engine uses an analytic formula to compute the model triaxial response. The analytic expressions for triaxial responses in uniform dipping anisotropic formation are known. There are many way to construct the cost function, and some may be more efficient than others. One example of a cost function is expressed as:

$$E = \sum_{i,j,k} w_{i,j,k} (\sigma m_{i,j,k} - \sigma_{i,j,k})^2, \qquad \text{Eq. (1-1)}$$

where $w_{i,j,k}$ is a weighting coefficient, $\sigma m_{i,j,k}$ is the measured conductivity tensor, and $\sigma_{i,j,k}$ is the modeled conductivity tensor.

The weighting function or coefficient, $w_{i,j,k}$, could, for example, be expressed in terms of the standard deviation of the sonde error measurement, $\sigma_{i,j,k}$:

$$w_{i,j,k} = \text{Max}\left(0, \left[1 - \frac{\sigma std_{i,j,k}}{\text{abs}(\sigma m_{i,j,k})}\right]\right) \qquad \text{Eq. (1-2)}$$

This expression of the weighting function will make $w_{i,j,k} \approx 1$ if the amplitude ratio between the sonde error standard deviation and the measurement is near zero. The weighting function will decrease as the amplitude ratio increases, and $w_{i,j,k} \approx 0$ if the sonde error approaches or exceeds the magnitude of the measurement. Other forms of the weighting function, such as $W_{i,j,k}=1$, may also produce reasonable results. For that case, the larger amplitude measurements tend to have higher influence or effect on the cost function.

Other expressions for the cost function may serve. Generally, their common objective is to uniquely relate higher degrees of match or correspondence between the measurements and the model values, typically manifested by producing a lower cost. Additional examples of cost function expressions are given below:

$$E = \sum_{i,j,k} w_{i,j,k} \text{abs}(\sigma m_{i,j,k} - \sigma_{i,j,k})^n \qquad \text{Eq. (1-3)}$$

$$E = \sum_{i,j,k} w_{i,j,k} (\sigma m_{i,j,k} - \sigma_{i,j,k})^m, \qquad \text{Eq. (1-4)}$$

where m is an even number

The minimum number of measurements that enter into the cost function is preferably equal to the number of unknown model parameters to be inverted. Usually, more measurements are available and could be used to enhance the statistics of the inversion process.

Starting from a set of initial guess model parameter values, a minimization process can be used to determine the values of the inverted model parameters that produce the lowest possible cost function. For example, a non-linear, least square technique, such as the Levenberg-Marquardt method, can be used to iteratively search for the model parameter values that minimize the cost function in Eq. (1-1). For a given n-th iteration, the method computes the cost function, $E_n$, from the current model parameters, and the difference between the current cost function value and the previous cost function value, $\Delta E = \text{abs}(E_n - E_{n-1})$. Those results are used to check whether any of the exit criteria are satisfied. The exit criteria usually include, but are not limited to:

(a) Number of iterations>Nmax;
(b) Cost function $E_n < \epsilon_1$ (usually a very small constant); and
(c) $\Delta E < \epsilon_2$ (usually a very small constant).

If none of the exit criteria are satisfied, a further iteration is performed to determine the next trial parameter values in the direction of the steepest descent of E and the new parameter values are provided to the forward engine to compute a new set of model responses. If any one of the exit criteria is satisfied, no further iterations are performed and the current model parameters are output as inverted parameters.

Obviously, there is no guarantee that the non-linear, least square technique will converge to the correct answer. Usually, for complex problems like the current one, the cost function has many local minima. Thus, the process could easily locate a local minimum and thereby produce incorrect inverted model parameter values. Therefore, the robustness of such a technique depends heavily on the selection of the initial guess parameter values. For a robust inversion, preferably the method used to develop the initial guess parameter values produces a set of initial guess parameter values for which the cost function is very close to the global minimum.

For example, a coarse grid search strategy may be used to obtain the initial guess model parameter values for $\sigma h$, $\sigma v$, and $\theta$. The coarse grid values for Rh (or $1/\sigma h$) parameters, Rhi, may be obtained using the $\sigma zz$ components of the input conductivity tensors and the model $\sigma zz$ components through an interpolation routine. A seven point coarse grid for vertical resistivity, Rv, (or $1/\sigma v$) may be constructed through the $\sigma h/\sigma v$ ratio, referred to herein as "ratio_cg". The ratio coarse grid is preferably assigned the following values: ratio_cg=[1.0, 1.3, 1.7, 2.0, 3.0, 5.0, 10.0]. A ten point coarse grid for dip angle, referred to herein as "dip_cg", may be used. For example, the dip_cg grid may have the following values: dip_cg=[0, 10, 20, 30, 40, 50, 60, 70, 80, 90]. The initial guess method loops through all the combinations of the coarse grid values for Rh, ratio_cg, and dip_cg, and computes the cost function for each combination. The parameter values of the coarse grid that produce the lowest cost function are output along with the calculated azimuth angle $\Phi_i$ as initial guess values for the iterative inversion. The specific range and denseness of the initial guess coarse grids presented above represent a good compromise based on the results of many trials. Obviously, wider ranging and denser coarse grids will produce more robust initial guess values, but at the expense of higher computational cost.

Flags may be determined and used to indicate the complexity of a formation based on the results of the ZD inversion. Usually, the real formation is 3-dimensional and requires a full 3D model for accurate inversion. However, the state of the art for 3D inversion is not yet sufficiently mature for commercial operations. To render the processing more practicable, simplifying assumptions about the formation are often made. Such assumptions give rise to at least two classes of processing. One such class is referred to as "1D-axial" (or "axial 1D") inversion and another is called "1D-radial" (or "radial 1D") inversion.

The 1D-axial model assumes the formation within the processing window comprises parallel anisotropic layers, each with different Rh and Rv values. Furthermore, the dip and azimuth of all layers within the window are the same. Essentially, the formation Rh and Rv are allowed to vary in the axial direction only. Hence, the name 1D-axial. This model is used to obtain sharper vertical resolution Rh and Rv logs because it accounts for shoulder bed effects. The 1D-radial model assumes the formation is anisotropic, but without axial layers, and instead has concentric radial layers, each with different Rh and Rv values. This model is used to process data where invasion has occurred so as to obtain the resistivity of the virgin and invaded zones, as well as the diameter of the invasion.

Compared to a ZD inversion, the 1D-axial and 1D-radial models are of higher order. If the formation conditions fit the model requirements, the higher order processing generally improves certain aspects of the basic ZD logs. For example, the 1D-axial model may yield sharper Rh and Rv logs. The 1D-radial model may provide more accurate values for the virgin and invaded zone resistivities. However, it is not always obvious for which zones these higher order processing models are applicable. In a fully 3D formation zone, these higher order models may not yield better results. In fact, some modeling examples show that the 1D-axial processing yields worse results than a ZD inversion in a 3D formation. Thus, flags may be used to identify which zones are fully 3D formations, which zones are suitable for a 1D-axial model, and which zones are suitable for the 1D-radial model. The indicator flags for those three different zones may be created and used to delineate the zone boundaries.

Using the indicator flags insures higher quality results for the higher order inversions by limiting their running to those zones for which the model fits the formation conditions. Time is also saved because the higher order inversions usually are very time consuming. Field experience shows that running thousands of feet of data through a 1D-axial inversion takes many hours. For most of that data, the formation is fully 3D and the 1D-axial results do not show any improvement over the already existing ZD results. In many instances, the 1D-axial inversion yielded worse results than the ZD inversion due to the rapid change in dip and azimuth of the formation.

Figure 6:
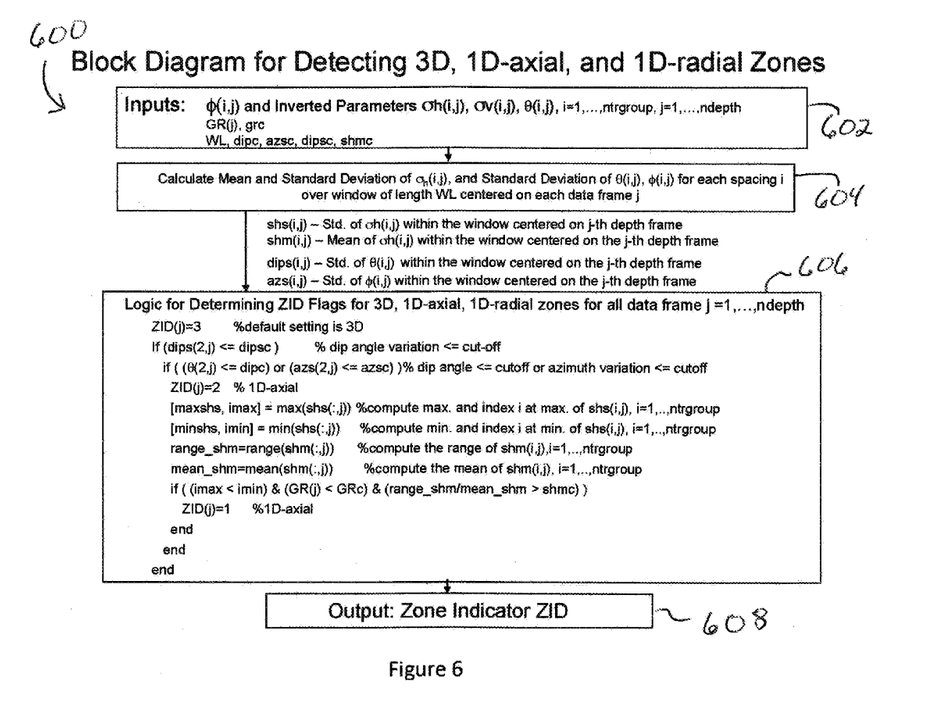
FIG. 6 is a flowchart showing a block diagram of exemplary logic that may be used to determine indicator flags for 3D, 1D-axial, and 1D-radial zones, in accordance with the present disclosure.

Let Rh(i, j), Rv(i, j), dip(i, j), and Az(i, j) be the results from the i-th TR spacing group ZD inversion at the j-th depth frame. The typical steps to derive the formation indicator flags are shown in the block diagram 600 of FIG. 6. In step 602, the formation properties and other values (described below) are provided. In step 604, the mean and standard deviation of the ZD inversion outputs are calculated using a sliding window of length WL centered on each data frame j. Specifically, the following intermediate quantities are computed:

shs(i, j)—Standard deviation of $\sigma h(i, j)$ within the window centered on the j-th depth frame;

shm(i, j)—Mean of $\sigma h(i, j)$ within the window centered on the j-th depth frame;

dips(i, j)—Standard deviation of $\theta(i, j)$ within the window centered on the j-th depth frame; and azs(i, j)—Standard deviation of $\phi(i, j)$ within the window centered on the j-th depth frame where i=1, . . . , ntrgroup (number of transmitter groups), and j=1, . . . , ndepth (number of depth frames).

Those intermediate results are used to determine and output a formation indicator flag ZID(j) at each depth frame j (steps 606 and 608, respectively) ZID is a tri-level flag which takes the following values:

ZID=1 indicates a 1D-radial zone suitable for running 1D-radial inversion;

ZID=2 indicates a 1D-axial zone suitable for running 1D-axial inversion; and

ZID=3 indicates a 3D zone with significant variation in dip and azimuth.

The following control parameters are used in the logic of defining the ZID flag:

dipc—cut off value for $\theta(i, j)$, below which the formation dip angle is consider so small that the formation azimuth will be undefined;

dipsc—cut off value for dips(i, j), the standard deviation of θ(i, j), above which the formation dip angle is considered highly variable;

azc—cut off value for azs(i, j), the standard deviation of Φ(i, j), above which the formation azimuth angle is considered highly variable;

grc—cut off value for a gamma ray (GR) value, below which the formation is considered to be permeable; and shmc—cut off value for the normalized variation of shm(i, j).

The ZID flag value is set to 3 as default. The following criteria are used to identify the 1D-axial and 1D-radial zones for any given depth index j. If the dips(2, j)<=dipsc (i.e., dip angle variation is small), and if either θ(2, j)<=dipc or azs(2, j)<=azc (i.e., dip angle is small or azimuth angle variation is small), then set ZID(j)=2 (i.e., 1D-axial zone). The following intermediate items are computed:

[maxshs, imax]=max(shs(i, j)), where maxshs and imax are the maximum of (shs(i, j)) and the index i for which shs(i, j) is maximum, i=1, . . . , ntrgroup;

[minshs, imin]=min(shs(i, j)), where minshs and imin are the minimum of (shs(i, j)) and the index i for which shs(i, j) is minimum, i=1, . . . , ntrgroup;

range_shm=range(shm(i, j)), where range_shm is the range of shm(i, j), i=1, . . . , ntrgroup; and mean_shm=mean(shm(i, j)), where mean_shm is the mean of shm(i, j), i=1, . . . , ntrgroup.

If imax<imin (i.e., short spacing should have larger variation in σh than long spacing), and GR(i)<grc (i.e., GR indicates permeable zone), and range_shm/mean_shm>shmc (i.e., significant variation in the normalized mean value of shm(i, j)), then set ZID(j)=1 (i.e., 1D-radial zone). Here, for the purpose of illustration, a Gamma Ray (GR) log and cutoff value was used to define a permeable zone. Any other log measurement that can indicate permeability properties could be used instead.

The best values for σh, σv, θ, and φ from the ZD inversion for the six TR spacing groups identified above can be determined. The following guidelines are useful for selecting the best ZD inversion results:

In a 3D formation, results from the shorter spacings suffer the least 3D effects and therefore are generally more accurate;

In a 1D-axial formation, short spacings generally yield better vertical resolution logs than the longer spacings; and In a 1D-radial formation having significant invasion effects, the longer spacings generally yield better results.

In a preferred embodiment, the second TR spacing group (15"+21"+27") represents the short spacing and the fifth TR spacing group (39"+54"+72") represents the long spacing. Essentially, the best ZD results come from the second TR spacing group if the formation is 3D or 1D-axial, and from the fifth TR spacing group if the formation is 1D-radial. Exemplary steps to select the best ZD inversion results are shown in the block diagram 700 of FIG. 7. The input data are the ZD inversion results σh(i, j), σv(i, j), θ(i, j), φ(i, j), and the formation indicator flag ZID(j), i=1, . . . , ntrgroup, j=1, . . . , ndepth (step 702). Steps 704 and 706 are preparatory, designed to create a smooth transition between the 1D-radial zone and other zones, and also to eliminate any sporadic thin zones within or near the big zone boundaries. Step 708 merges the short and long spacing data according to the formation indicator flag.

Figure 7:
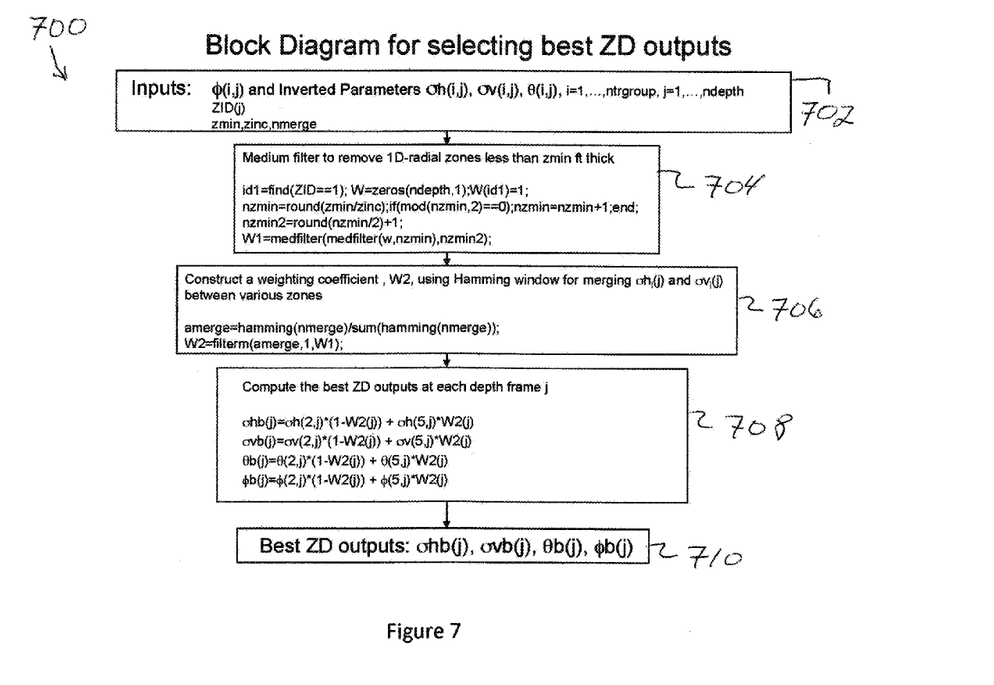
FIG. 7 is a flowchart showing a block diagram of one embodiment that may be used to select a preferred ZD output, in accordance with the present disclosure.

In step 704, a weighting coefficient array W is constructed. W has the same length, ndepth, as the data. W is assigned a value of one in the zones where ZID(j)=1 (1D-radial zones) and zero elsewhere. To eliminate the sporadic thin 1D-radial zones that sometimes occur around a thick bed boundary or within a thick bed, a nested median filter is applied to W. The length of the median filter is controlled by two input parameters, zmin and zinc, which specify the minimum length of the 1D-radial zone and the depth sampling increment, respectively. Usually zmin=10 ft will produce reasonable results. Using zmin and zinc, two odd numbers, nzmin and nzmin2, are obtained and used as the length of the main and nested medium filters, respectively. Here, nzmin=round(zmin/zinc) converts zmin to the number of depth samples. Round(x) is an operator that round x to the nearest integer. To convert nzmin to an odd number, we do the following check: if (mod(nzmin,2)==0), then nzmin=nzmin+1. Here, mod(a, b) is an operator that produces the remainder of a divided by b. Then, nzmin2=round (nzmin/2)+1 and W1=medfilter(medfilter(w, nzmin), nzmin2). Here, medfilter(x, n) is an operator that produces a length n median filter output on input array x. W1 is the output of the nested median filter of W. The median filter operation effectively removes thin (thickness less than zmin ft) zones of either W=1 or W=0 by assigning the W value of the thin zone to the surrounding, thicker zone's value.

In step 706, the W1 array is filtered by a normalized Hamming window filter of length nmerge, which is a control parameter settable by the user. The parameter nmerge is an odd number for the number of points over which the short spacing results and long spacing results are merged together smoothly. Usually nmerge should cover only a few feet of the data. The coefficient of the normalized Hamming window filter, amerge, is given as amerge=hamming(nmerge)/sum(hamming(nmerge)). Here, hamming(n) is a function that produces a Hamming window of length n and sum(x) is a function that produces the sum of the array x. Let W2 be the filtered W1 array given as W2=filterm(amerge, 1, W1). Here, filterm is an operator symbol that would convolve the input array W1 with the filter coefficient amerge. The parameter filterm can also apply a shift to remove a filter delay.

In step 708, the best ZD outputs at each depth frame j are computed via the following formula:

$$\sigma hb(j)=\sigma h(2,j)*(1-W2(j))+\sigma h(5,j)*W2(j);$$

$$\sigma vb(j)=\sigma v(2,j)*(1-W2(j))+\sigma v(5,j)*W2(j);$$

$$\theta b(j)=\theta(2,j)*(1-W2(j))+\theta(5,j)*W2(j);$$

and $$\phi b(j)=\phi(2,j)*(1-W2(j))+\phi(5,j)*W2(j).$$

Those results are output (step 710).

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine a formation property of a subsurface formation, comprising:

providing a downhole logging tool having two or more tri-axial antennas;

placing the downhole logging tool having two or more tri-axial antennas into a wellbore;

obtaining azimuthally sensitive data using the antennas of the downhole logging tool;

performing borehole correction on the obtained data;
performing a zero dimensional inversion on the borehole corrected data for all antennal spacing groups;
determining a formation indicator flag;
performing a 1D-axial inversion and/or a 1D radial inversion over selected zones, or neither, based on the determined formation indicator flag;
selecting the best zero dimensional inversion results;
combining the 1D-axial inversion results and/or the 1D-radial inversion results, if any, with the selected best zero dimensional inversion results to form a composite inversion result; and
determining the formation property of the subsurface formation using the composite inversion result.

2. The method of claim 1, wherein the downhole logging tool is disposed on a wireline, a drill string, or a wired drill pipe.

3. The method of claim 1, wherein the obtaining azimuthally sensitive measurements comprises transmitting and receiving an electromagnetic signal transmitted at a certain frequency, or transmitting and receiving a plurality of electromagnetic signals, each of the electromagnetic signals being transmitted at different frequencies.

4. The method of claim 1, wherein performing a zero dimensional inversion comprises determining a formation azimuthal angle using the obtained data; producing a set of modeled formation parameters using a forward engine of modeling software; evaluating a cost function using the model response from the forward engine and the obtained data; and outputting zero dimensional inversion formation properties once an exit condition of the cost function is satisfied.

5. The method of claim 4, wherein evaluating the cost function comprises determining a global minimum of the cost function.

6. The method of claim 4, further comprising using a coarse grid search strategy to provide initial guess model parameter values.

7. The method of claim 1, wherein each antenna spacing group is formed from one or more transmitter-receiver antenna spacings.

8. The method of claim 1, wherein determining the formation indicator flag comprises providing model formation property values and other user-specified input values; determining the mean and standard deviation of the zero dimension inversion outputs using a sliding window centered on each data frame; calculating intermediate results; and determining the formation indicator flag for each depth frame using the intermediate results.

9. The method of claim 1, wherein performing a 1D-inversion comprises assuming that portion of the formation that is within a processing window has parallel anisotropic layers, each with different $Rh$ and $Rv$ values, and the dip angles and azimuthal angles of all layers within the processing window are substantially the same.

10. The method of claim 9, further comprising obtaining sharper vertical resolution $Rh$ and $Rv$ logs.

11. The method of claim 9, further comprising accounting for shoulder bed effects.

12. The method of claim 9, further comprising determining a distance to a bed boundary.

13. The method of claim 1, wherein performing a 1D-radial model assumes the formation is anisotropic, has no axial layers, and has concentric radial layers, each with different $Rh$ and $Rv$ values.

14. The method of claim 13, further comprising determining the resistivity of a virgin zone, the resistivity of an invaded zone, and a diameter of invasion.

15. The method of claim 1, wherein selecting the best zero dimensional inversion results comprises using results from a shorter TR spacing group if the formation is characterized as a 3D formation or a 1D-axial formation, and using results from a longer TR spacing group if the formation is characterized as a 1D-radial formation.

* * * * *